United States Patent [19]

Puma et al.

[11] Patent Number: 5,495,427
[45] Date of Patent: Feb. 27, 1996

[54] HIGH SPEED HIGH RESOLUTION ULTRASONIC POSITION AND ORIENTATION TRACKER USING A SINGLE ULTRASONIC FREQUENCY

[75] Inventors: Sam C. Puma, Torrance; Brian D. Brody, Studio City; Gregory R. Lee, Torrance, all of Calif.

[73] Assignee: Northrop Grumman Corporation, Los Angeles, Calif.

[21] Appl. No.: 267,709

[22] Filed: Jun. 29, 1994

Related U.S. Application Data

[63] Continuation-in-part of Ser. No. 912,962, Jul. 10, 1992, Pat. No. 5,339,259.

[51] Int. Cl.$^6$ .................................................. G01S 15/50
[52] U.S. Cl. ...................... 364/516; 364/559; 367/117; 367/125; 340/870.41
[58] Field of Search .................................. 364/516, 559, 364/561, 562; 367/117, 118, 124, 125; 340/870.41; 244/221, 222

[56] References Cited

U.S. PATENT DOCUMENTS

| | | | |
|---|---|---|---|
| 3,777,305 | 12/1973 | Stoutmeyer | 367/127 |
| 3,805,227 | 4/1974 | Lester | 367/6 |
| 3,836,953 | 9/1974 | Rotier | 367/117 |
| 3,869,694 | 3/1975 | Merchant et al. | 367/117 |
| 3,876,016 | 4/1975 | Stinson | 175/45 |
| 3,979,712 | 9/1976 | Ettenhofer et al. | 367/125 |
| 4,303,394 | 12/1981 | Berke et al. | 434/40 |
| 4,446,480 | 5/1984 | Breglia et al. | 364/559 |
| 4,807,202 | 2/1989 | Cherri et al. | 367/129 |
| 4,862,152 | 8/1989 | Milner | 364/712 |
| 4,991,148 | 2/1991 | Gilchrist | 367/124 |
| 5,280,457 | 1/1994 | Figueroa et al. | 367/127 |
| 5,339,259 | 8/1994 | Puma et al. | 364/559 |
| 5,367,614 | 11/1994 | Bisey | 395/119 |

*Primary Examiner*—Emanuel T. Voeltz
*Assistant Examiner*—Kyle J. Choi
*Attorney, Agent, or Firm*—Terry J. Anderson; Karl J. Hoch, Jr.

[57] ABSTRACT

An ultrasonic tracking system embodying the invention has an array of plural ultrasonic detectors at discrete locations, the plural detectors being responsive to an ultrasonic signal of frequency f emanating from a single remote transmitter to produce respective plural electronic signals corresponding to the ultrasonic signal as received at respective ones of the plural detectors, and a processor for determining from the plural electronic signals a direction of travel of the ultrasonic signal relative to the array of ultrasonic detectors. In order to provide range, a phase shift key encoder connected to the transmitter encodes every N cycles of the ultrasonic signal with one of a succession of encoder counts, while a phase shift key decoder coupled to receive an electronic signal from one of the plural detectors produces a new decoder count every N cycles of the electronic signal that are decodable. A range processor connected to the phase shift key encoder and to the phase shift key decoder receives simultaneously the encoder counts and the decoder counts. From the encoder and decoder counts, the range processor computes a distance between the transmitter and the one detector.

20 Claims, 8 Drawing Sheets

HIGH SPEED HIGH RESOLUTION ULTRASONIC POSITION AND ORIENTATION TRACKER USING A SINGLE ULTRASONIC FREQUENCY

BACKGROUND OF THE INVENTION

Cross-Reference to Related Applications

This patent application is a continuation-in-part of U.S. patent application Ser. No. 07/912,962, filed Jul. 10, 1992 by S. Puma et al. entitled "HIGH SPEED HIGH RESOLUTION ULTRASONIC POSITION AND ORIENTATION TRACKER," now U.S. Pat. No. 5,339,259.

TECHNICAL FIELD

The invention is related to position tracking systems generally and particularly to tracking pilot helmet position in the cockpit of a flight vehicle or simulator using ultrasonic transmitters mounted in the cockpit and ultrasonic transducers mounted on the helmet, or vice versa.

Background Art

Position tracking systems for monitoring the position of an article such as a pilot's helmet in a cockpit are useful for such purposes as maintaining a computer-generated projected image display in the pilot's field of view, for example. Other purposes include tracking any part of a person's body such as the head, hand or finger, so that the person may generate inputs to a computer by the movement of his head, hand or finger, for the control of cursor movement in a computer display, for example. Other applications include robotics and weapon systems.

Figures 1, 5:
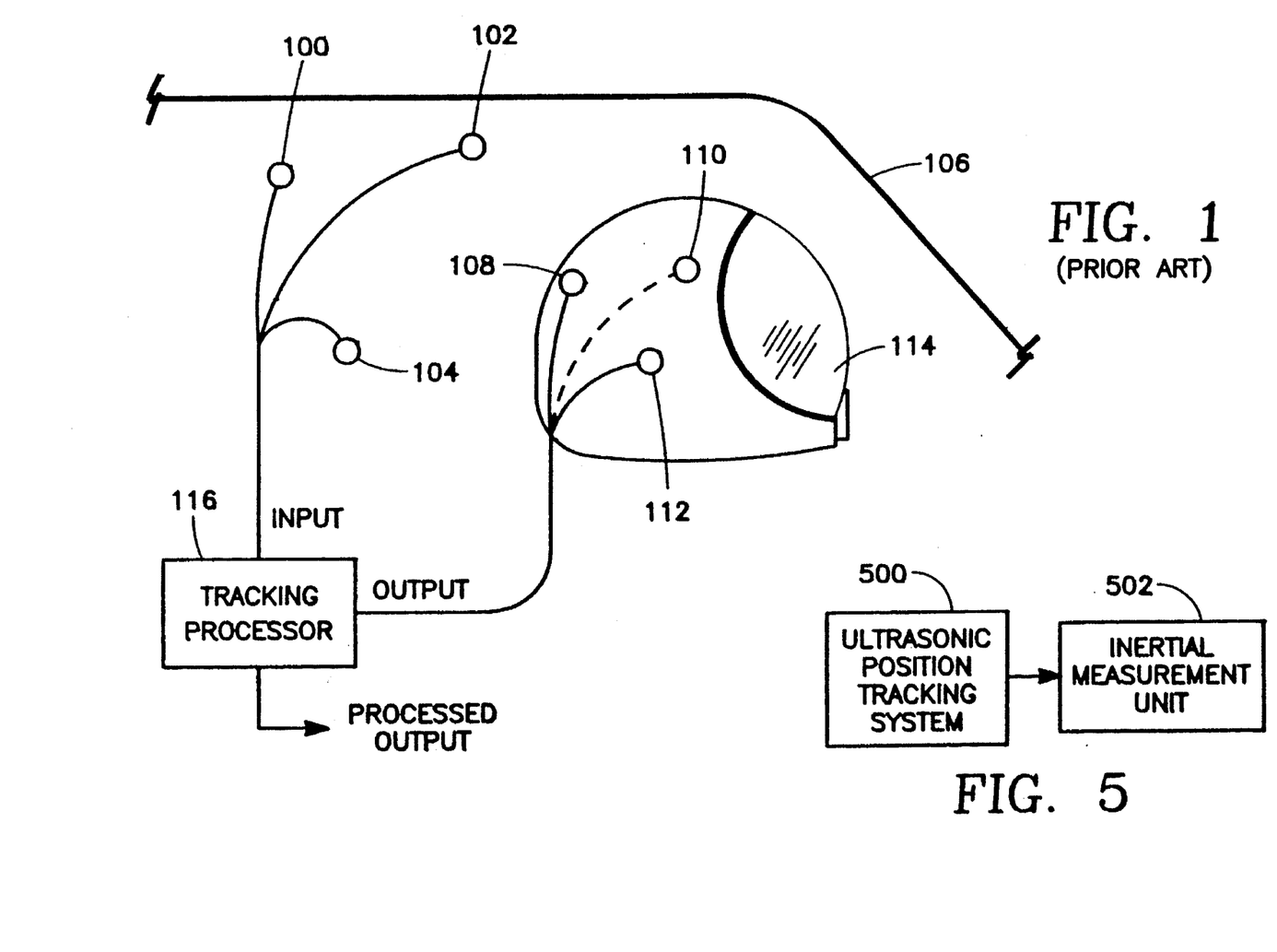
FIG. 1 is a simplified diagram of an ultrasonic position tracking system of the prior art employing three transmitters operating at three different frequencies and three transducers.
FIG. 5 is a simplified block diagram illustrating the application of the circuit of FIG. 2 with an inertial measurement unit.

The advantages of employing ultrasonic waves to perform such position tracking over techniques employing electromagnetic signals (such as those disclosed in U.S. Pat. No. 4,742,356 to Kuipers and U.S. Pat. No. 4,303,394 to Berke et al.) are well-known. Essentially, electromagnetic systems are far more vulnerable to interference from many noise sources. Ultrasonic position tracking techniques are well-known. For example, U.S. Pat. No. 4,807,202 to Cherri et al. discloses an ultrasonic tracking system in which the orientation and position of a movable object (such as a helmet) in a closed frame of reference (such as a cockpit) is continually tracked by following the six degrees of freedom of movement of the moveable object. This is accomplished, as illustrated in FIG. 1 hereof, by mounting three ultrasonic transmitters 100, 102, 104 in three different locations in the closed frame of reference 106 and mounting three ultrasonic transducers 108, 110, 112 in three different locations on the moveable object 114. Each one of the three transmitters 100, 102, 104 transmits an ultrasonic acoustic wave signal at a different ultrasonic frequency, all of which are received at each one of the three transducers 108, 110, 112. The three ultrasonic frequencies received at each transducer are separated into three received signals, so that a total of nine signals are received and processed. A tracking processor 116 processes each of the nine signals to provide the distance between the transducer and the transmitter corresponding to the frequency of the received signal, thus providing nine distances. Using well-understood principles, the tracking processor 116 computes the instantaneous position and orientation of the moveable object 114 with respect to the closed frame of reference from the nine distances. This computation uses the locations of the transmitters in the closed frame of reference and the locations of the transducers with respect to the frame of reference of the moveable object.

Various methods of transmitting and processing the ultrasonic signals are employed, all with varying degrees of limited performance. The basic limitation of such methods is that they are slow, limiting the rate at which the position and orientation of the movable object can be repeatedly computed. Most of the methods employ a pulsed ranging ultrasonic technique, such as the techniques disclosed in U.S. Pat. No. 4,853,863 to Cohen et al., U.S. Pat. No. 4,807,202 to Cherri et al., U.S. Pat. No. 3,836,953 to Rotier and U.S. Pat. No. 3,777,305 to Stoutmeyer.

The above-referenced patent to Cohen et al. discloses an ultrasonic position tracking technique in which the frequency shift of the ultrasonic signal due to helmet movement is measured and integrated to provide a displacement value from which the transmitter-to-receiver range is computed.

The problem with the pulse or sequential techniques is that the time required for the receiver to acquire a sufficient ultrasonic signal from which the transmitter-to-receiver range can be inferred limits the rate at which the helmet position can be tracked. For example, the ultrasonic pulsed ranging techniques are limited by the time of flight between the transmitter and the receiver. Generally, it is believed that such sequential techniques produce an updated position measurement for a given sensor at a rate not exceeding on the order of 10 Hz. Most users would be pleased by a 100 Hz update rate. Pulse or sequential techniques are limited to a total time of 9 time-of-flight intervals, or about 30 ms. In a room with echoes, this figure may be 3 or 4 times as large. Consequently, the maximum update rate for sequential techniques is 30 Hz, although a more practical update rate is 10 Hz. Another problem with sequential techniques is that the data is incoherent. The 9 ranges are not simultaneous. As will be shown below, the present invention provides the 9 ranges simultaneously as coherent data, a significant advantage over the prior art.

The problem with the technique of integrating the frequency shift is that its maximum update rate is limited by the time required to measure frequency, compute the doppler shift and then integrate it so as to produce a displacement value from which to compute a range.

The use of plural ultrasonic frequencies to provide separate ultrasonic signal processing at each sensor has the drawback of creating a relatively noisy environment, which tends to detract from the system performance. An example of an acoustical tracking system responding to many different frequencies is described in U.S. Pat. No. 4,333,170 to Mathews et al., wherein there is no active acoustic transmitter, and the sound emanates from a passive target at an unknown location. The present invention concerns a system employing an active ultrasonic transmitter transmitting at a single predetermined ultrasonic frequency. Unlike the Mathews et al. system, the present invention concerns enhancing the type of system in which sound is actively transmitted at known frequencies from fixed predetermined locations while the sensor array is mounted on a helmet (or other moving platform) whose location and orientation is to be determined and updated at rapid intervals. The Mathews et al. system cannot detect rotations of its passive target involving no translation of the target, and therefore is unsuitable in helmet tracking systems.

What is needed is an ultrasonic position tracking system, employing a single active ultrasonic source, which will track the moveable object position at a high rate without requiring many different ultrasonic frequencies.

SUMMARY OF THE INVENTION

An ultrasonic tracking system embodying the invention has an array of plural ultrasonic detectors at discrete locations, the plural detectors being responsive to an ultrasonic signal of frequency f emanating from a single remote transmitter to produce respective plural electronic signals corresponding to the ultrasonic signal as received at respective ones of the plural detectors, and a processor for determining from the plural electronic signals a direction of travel of the ultrasonic signal relative to the array of ultrasonic detectors. The processor stores a matrix K which is a function of a displacement matrix D including vectors defining locations of respective ones of the plural detectors in the frame of reference. The processor includes digital signal processors which sense the phase angles of each of the electronic signals and to produce a phase difference vector including, respectively, differences between the phase angle of the electronic signal of one of the plural detectors and the phase angles of the electronic signals of respective remaining ones of the plural detectors. The processor produces an orientation vector defining an orientation of the transmitter relative to the frame of reference of the array of detectors by multiplying the phase difference vector by the matrix K. The processor computes an azimuth angle and an elevation angle from the orientation vector.

In order to provide range, a phase shift key encoder connected to the transmitter encodes every N cycles of the ultrasonic signal with one of a succession of encoder counts, while a phase shift key decoder coupled to receive an electronic signal from one of the plural detectors produces a new decoder count every N cycles of the electronic signal that are decodable. A range processor connected to the phase shift key encoder and to the phase shift key decoder receives simultaneously the encoder counts and the decoder counts. From the encoder and decoder counts, the range processor computes distance between the transmitter and the one detector.

The computation of the range is carried out by storing a first encoder count from the phase shift key encoder, then, upon receipt from the phase shift key decoder of a decoder count equal to the first encoder count, sensing the concurrent encoder count from the phase shift key encoder. The processor subtracts the first encoder count from the concurrent encoder counts and computes the range from the resulting difference. The range is computed by multiplying the difference by Nc/f, where N is the number of cycles of the ultrasonic signal encoded by the phase shift key encoder with an encoder count, c is the speed of propagation of the ultrasonic signal from the transmitter to the array of ultrasonic detectors and f is the frequency of the ultrasonic signal. The encoder count and the decoder count each lie in a range of binary values between 0 and $2^N-1$. In one embodiment, the phase shift key encoder employs a phase shift key code in which respective ones of the N cycles correspond to respective binary bits and wherein each one of the N cycles represents a binary one if shifted by a predetermined phase shift and represents a binary zero if not shifted. The predetermined phase shift may be 180 degrees, as one example. The ultrasonic tracking system is preferably a digital system in which the processor includes respective analog to digital converters having analog inputs connected to respective ones of the plural detectors and having digital outputs, respective digital signal processors having digital inputs connected to the digital outputs of respective analog to digital converters, the digital signal processors being programmed to compute a phase angle of the signal received at its input.

BRIEF DESCRIPTION OF THE DRAWINGS

FIG.'S 3A through 3C are contemporaneous diagrams of time domain waveforms generated in the operation of the circuit of FIG. 2.

FIG.'S 3D through 3G are diagrams of correlative phase domain waveforms generated in the operation of the circuit of FIG. 2.

DETAILED DESCRIPTION OF THE INVENTION SYSTEM DISCLOSED IN THE PARENT APPLICATION

Figure 2:
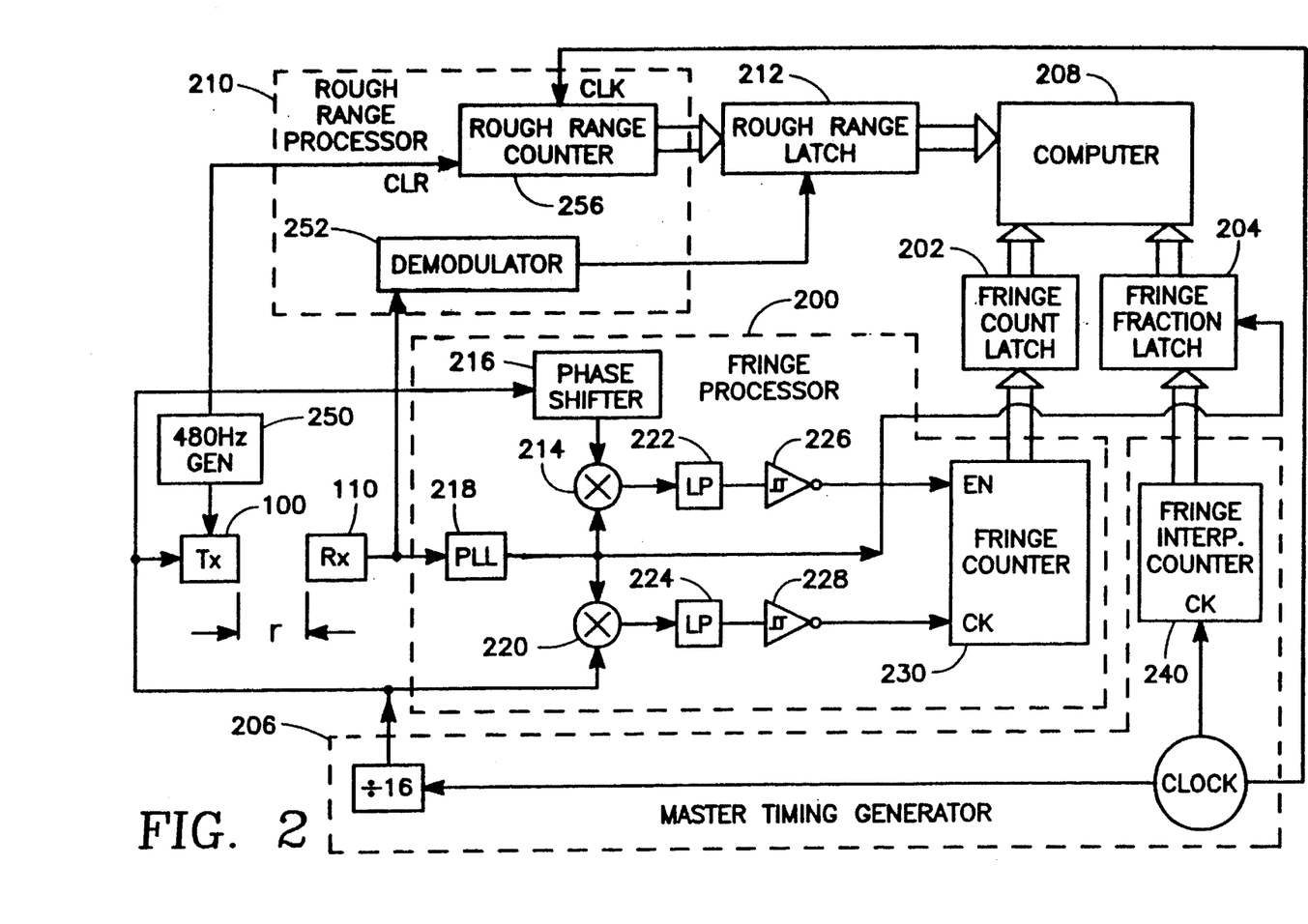
FIG. 2 is a schematic block diagram illustrating one channel of a circuit in the system of the parent application.

FIG. 2 illustrates a typical circuit of the invention used in each one of the nine channels in the tracking processor 116 of FIG. 1. In the example illustrated in FIG. 2, the circuit processes the one signal received by the transducer 110 from the transmitter 100, it being understood that there are a total of nine such processing tasks to be performed, corresponding to the nine received signals discussed above with reference to FIG. 1.

The main advantage of the invention is that it exploits the C.W. form of the received ultrasonic signal by an interferometric comparison of the transmitted and received versions of a signal in which any change by a single fringe of the resulting interference pattern produces a change in the computed tracking position. The fastest rate at which this change can occur is the frequency of the ultrasonic signal, or about 40 KHz in one implementation of the invention. This is an increase in tracking rate of about two orders of magnitude over the prior art.

Overview

The interferometric displacement detector circuit of FIG. 2 includes a fringe processor 200 having inputs connected to receive both the transmitted and received signals, a fringe count latch 202 connected to one output of the fringe processor 200 and a fringe fraction latch 204 connected to another output of the fringe processor 200. A master timing generator 206 synchronizes the operation of the circuit of FIG. 2 and the generation of the ultrasonic signal (on the order of 40 kHz, for example) produced by the transmitter 100. The pair of latches 202 and 204 are periodically sampled by a computer 208. As will be described below herein, the computer 208 samples a total of nine such pairs of latches corresponding to the nine received ultrasonic signals discussed hereinabove. The computer 208 is programmed in accordance with the prior art techniques referred to previously herein to compute the position and orientation of the helmet or tracked object 114.

Accompanying the interferometric detector circuit is a rough range processor 210 which responds to a low frequency (480 Hz, for example) signal modulating the ultrasonic carrier transmitted by the transmitter 100 to provide a rough but unambiguous position of the helmet 114 within the cockpit or frame of reference 106. The output of the rough range processor 210 is held in a rough range latch 212 which is sampled by the computer 208 as desired. The wavelength of the rough range modulation signal must be at least on the order of the diameter or greatest length of the cockpit or closed frame of reference 106, and so its frequency is typically on the order of 480 Hz.

Fringe Processor

The fringe processor 200 detects the phase differences between the received signal of the transducer 110 and the transmitted signal in quadrature pair and deduces therefrom each zero-crossing of the phase difference. The fringe processor 200 includes a phase detector 214 which detects the phase difference between two signals: (a) the signal transmitted by the transmitter 100 and signal phase-shifted by 90 degrees by a phase shifter 216 and (b) the signal received by the receiver 110 and bandpass filtered and converted to square wave by a phase-locked loop 218. (For this purpose, the phase-locked loop 218 is of the type well-known in the prior art having a square wave oscillator.) Another phase detector 220 detects the phase difference between the transmitted signal and the output of the phase-locked loop 218. The output signal amplitudes of the detectors 214, 220 are proportional to the phase differences of the signal pairs received by the phase detectors. The output signals of the pair of phase detectors 214, 220 are low pass filtered by a pair of filters 222, 224 and are compared with a threshold by a pair of Schmitt triggers 226, 228, respectively.

Operation of the Fringe Processor

Figure 3A:
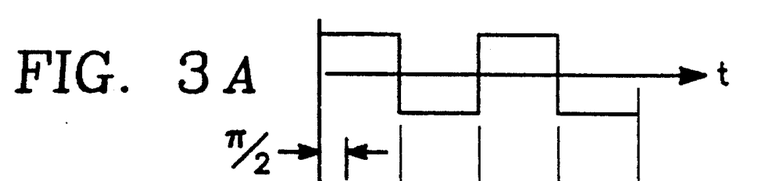
Figure 3B:
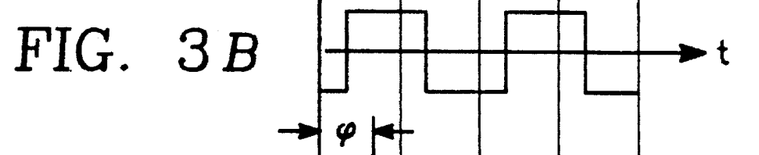
Figure 3C:
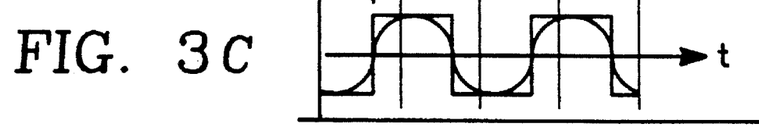
Figures 3D, 3E:
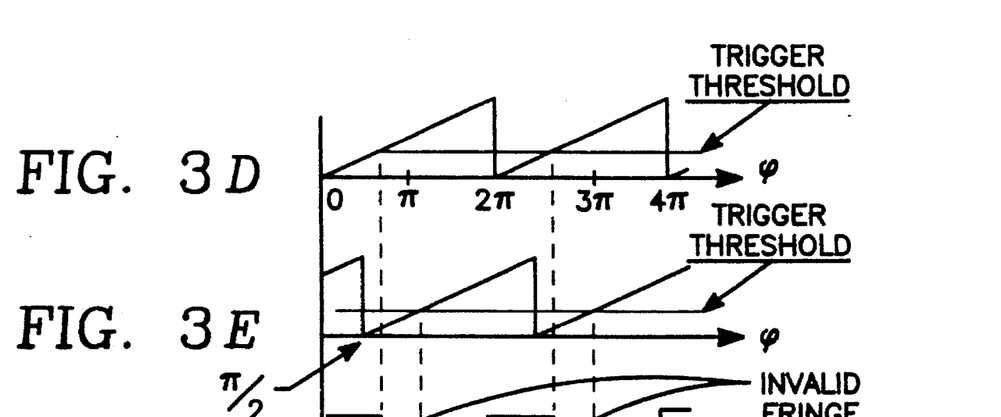

FIG. 3A illustrates the time domain pulsed waveform (a square wave) of the signal furnished by the master timing generator 206 to the transmitter 100. The reactive elements of the transmitter 100 (or, alternatively, an active filter not shown in the drawings) convert the square waveform to a corresponding sine wave shown in FIG. 3A, so that a sine wave C. W. signal is received by the transducer 110. FIG. 3B illustrates the waveform at the output of the phase shifter 216. FIG. 3C illustrates the signal received by the transducer 110 as converted to a square wave at the output of the phase-locked loop 218. FIG.'S 3D and 3E illustrate in the phase domain the magnitude of the signal at the output of the low pass filters 222 and 224, respectively, as a function of increasing phase difference detected by the phase detectors 214, 220, respectively.

Figures 3F, 3G:
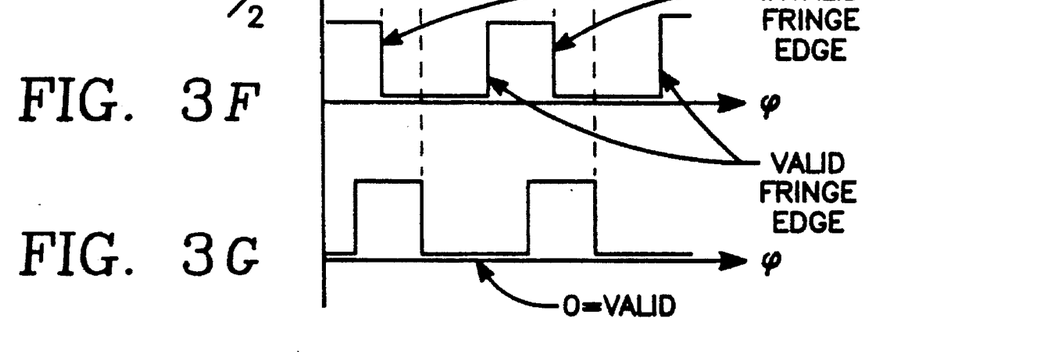

FIG.'S 3F and 3G illustrate the outputs of the Schmitt triggers 226, 228, respectively. Essentially, each time the input to the Schmitt trigger 226 or 228 falls below its trigger threshold (dashed line of FIG. 3D or 3E), the Schmitt trigger output goes high, and each time the input rises above the trigger threshold the output goes low. Note that the leading edges of the output of the Schmitt trigger 228 (FIG. 3F) coincide with the zero phase crossings of the phase detector 220 (FIG. 3D), which is the only one of the two phase detectors whose input is not phase shifted. These leading edges of the Schmitt trigger 228 are detected by employing the output of the other Schmitt trigger 226 as a gate: whenever the output of the other Schmitt trigger 226 is low, sampling of the output of the Schmitt trigger 228 is enabled. For this purpose, the fringe counter 230 has its clock input connected to the Schmitt trigger 228 and its enable input connected to the other Schmitt trigger 226. The fringe counter 230 is of the well-known type in which up-going transitions at its clock input cause the fringe counter 230 to count up while down-going transitions at its clock input cause the fringe counter 230 to count down. The contents of the fringe counter 230 indicate the number of fringes or zero crossings caused by displacement of the helmet 114.

Fringe Interpolation

The master timing generator 206 produces fringe interpolation clock pulses at a rate which is an integral multiple (e.g., 4, 8, or 16 times) the frequency of the transmitted ultrasonic signal. A fringe interpolation counter 240 counts the fringe interpolation clock pulses. The rate of the fringe interpolation clock pulses (e.g., n times the transmitted ultrasonic signal frequency) and the modulus of the counter 240 (e.g., n) are selected so that the counter 240 automatically resets at the end of each sinusoidal period of the transmitted ultrasonic signal. The fringe fraction latch 204 latches the output of the fringe interpolation counter 240 in synchronism with the received ultrasonic signal at the output of the phase-locked loop 218. Thus, the change in phase (range) between fringes is measured to within a fraction (1/n) of the wavelength of the ultrasonic signal.

In the example of FIG. 2, the master timing generator 206 derives the ultrasonic carrier for the transmitter 100 by dividing down the fringe interpolation counter by some integer (e.g., 16). However, the ultrasonic carrier may be derived by simply connecting the transmitter 100 to the most significant bit of the fringe counter 240.

Rough Ranging

The rough range processor 210 operates simply by measuring the phase of the low frequency (e.g., 480 Hz) modulation signal imposed on the ultrasonic carrier. Since the wave length of the low frequency modulation is at least as great as the longest dimension of the closed frame of reference or cockpit 106, each slice is a unique location range in the cockpit 106.

As illustrated in FIG. 2, a low frequency (e.g, 480 Hz) oscillator 250 modulates the ultrasonic signal transmitted by the transmitter 100. A conventional AM demodulator 252 in the rough range processor 210 demodulates the low frequency (e.g., 480 Hz) signal received at the receiver 110. In the meantime, a rough range counter counts 256 up in synchronism with the low frequency oscillator 250 and is latched in the latch 212 by the output of the demodulator 252. Preferably, the modulus of the rough range counter 256 and rate at which it counts are selected to that the counter 256 resets at the end of each period of the low frequency modulation signal. Thus, the contents of the latch 212 indicates the phase of the modulation, which is a direct measure of the range between the transmitter and receiver.

Multi-channel Layout

Figure 4:
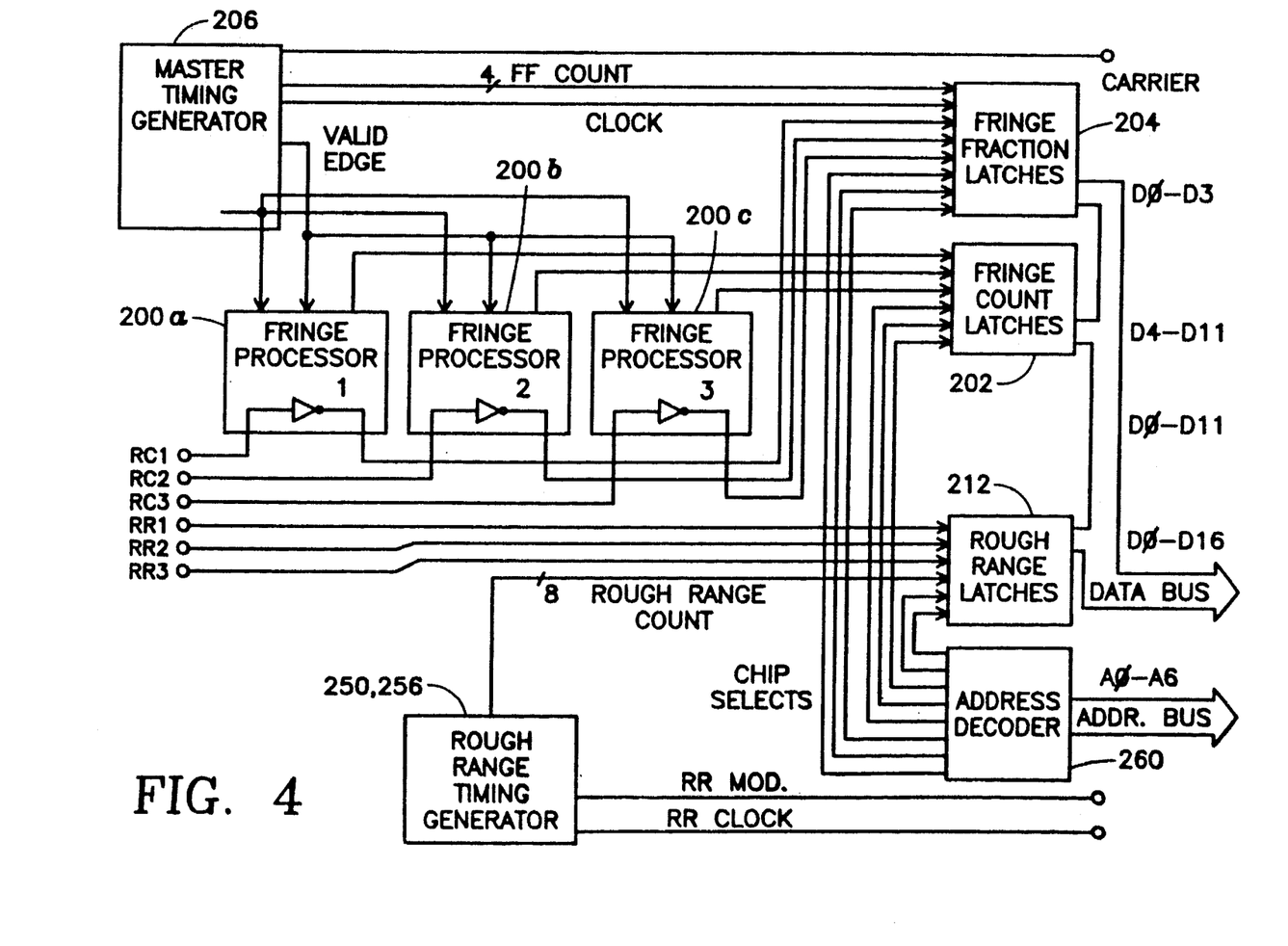
FIG. 4 is a schematic block diagram illustrating a digital implementation of three channels of the type illustrated in FIG. 2.

FIG. 4 is a diagram corresponding to FIG. 2 but showing at a higher level how the three ultrasonic frequencies detected by the receiver 110 are processed. In one implementation of the invention, the three ultrasonic frequencies are 37 kHz, 40 kHz and 43 kHz. Thus, in FIG. 4 there are three fringe processors 200a, 200b and 200c corresponding to the fringe processor 200 of FIG. 2, three ultrasonic received carrier signals RC1, RC2 and RC3 and three rough range received signals RR1, RR2 and RR3. In addition, an address decoder 260 permits the computer 208 to selectively address any one or portions of the various latches 204, 204 and 212, in accordance with well-known techniques, as required by the computer's program. The apparatus of FIG. 4 is associated with one of the transducers, there being three transducers in all, so that FIG. 4 illustrates about one third of the system of the invention comprising a complete tracking processor of the type illustrated in FIG. 1.

Computer

The contents of the latches 202 and 204 provide the range between the transmitter 100 and the transducer 110 in the form of a wavelength count (the latch 202) and a fraction of a wavelength (the latch 204). The computer 208 is programmed in accordance with the techniques of the prior art discussed hereinabove to periodically sample the contents of the latches 202 and 204 for each of the nine received ultrasonic signals and compute therefrom the helmet position and orientation.

Combination with an Inertial Measurement Unit

Referring to FIG. 5, the system 500 of FIG. 1 implemented with three circuits of FIG. 4 for each of the three transducers 108, 110, 112 is used to periodically update an inertial measurement unit 502. The inertial measurement unit constantly provides position and orientation data, while the ultrasonic position tracking system of the invention 500 provides measurements only at periodic intervals corresponding to the position tracking rate discussed above. However, while the inertial measurement unit is therefore superior in its ability to continuously provide such measurements, it suffers from a tendency to drift. The advantage of the embodiment of FIG. 5 is that drift errors are minimized by periodically updating the inertial measurement unit 502 with its correct position and orientation as measured by the ultrasonic tracking system 500 at a very high rate. For this purpose, the three transducers 108, 110, 112 are placed on the inertial measurement unit 502, while the output of the computer 208 embodying the tracking processor 116 of FIG. 1 is transmitted to the inertial measurement unit 502. The inertial measurement unit updates its position and orientation data with the measurements received from the ultrasonic tracking system 500.

THE PRESENT INVENTION

SINGLE ULTRASONIC FREQUENCY TRACKING SYSTEM

While the system of FIGS. 1–5 employs a separate ultrasonic transmitter 100 at a unique ultrasonic frequency received by a respective ultrasonic sensor for each one of the nine measurements, the present invention employs only a single ultrasonic transmitter received by all ultrasonic sensors on the helmet 114.

Azimuth and Elevation

Figure 6:
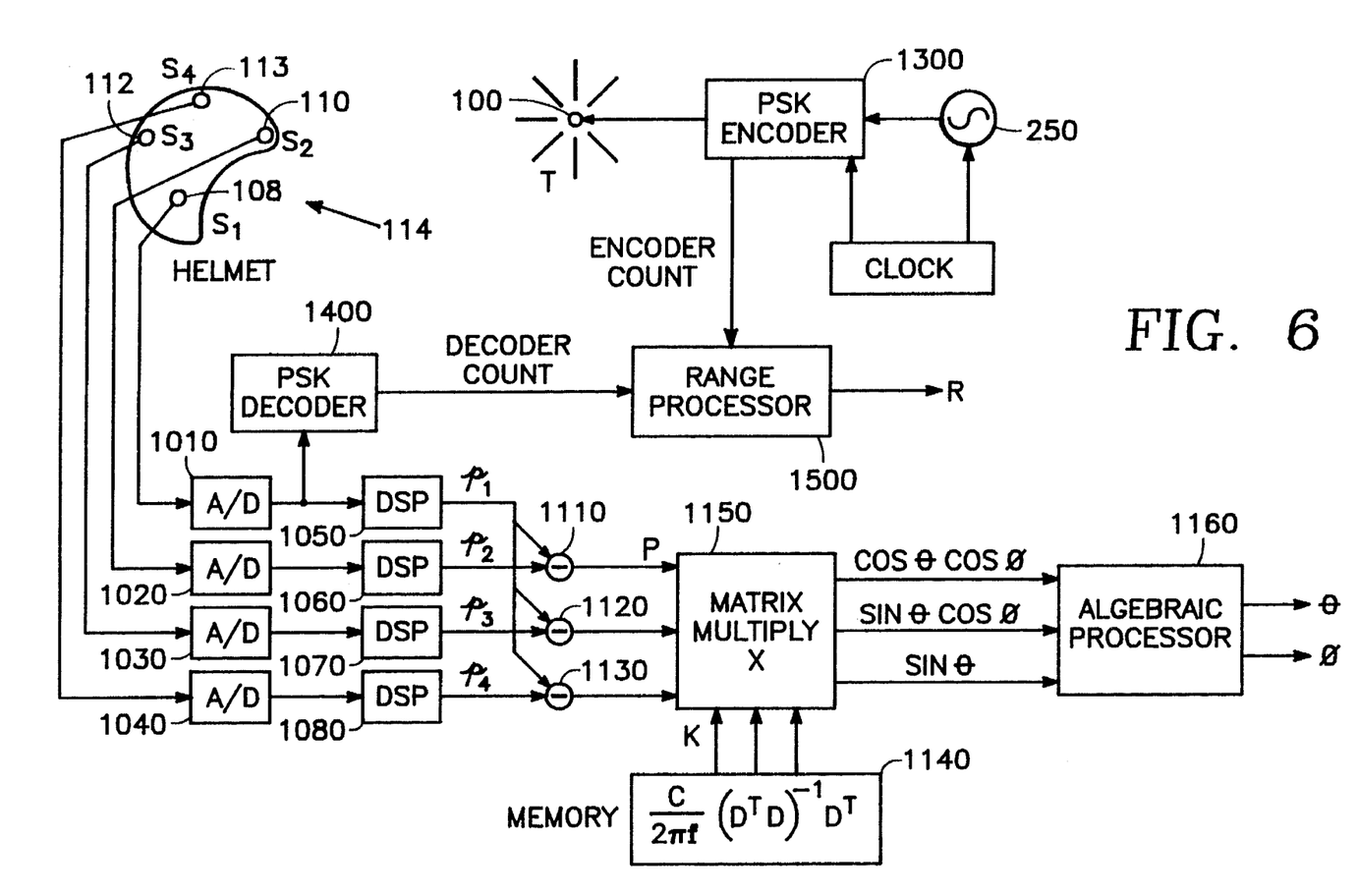
FIG. 6 is a schematic block diagram of an ultrasonic tracking system of the present invention.

Referring now to FIG. 6, a single ultrasonic transmitter 100 located a a fixed predetermined location transmits a single ultrasonic tone of frequency f which propagates at a speed c to each of the sensors 108, 110, 112, 113. The outputs of the ultrasonic sensors 108, 110, 112, 113 on the helmet 114 are connected to respective analog-to-digital (A/D) converters 1010, 1020, 1030, 1040. In FIG. 6, the ultrasonic sensors 108, 110, 112, 113 are labelled $S_1$, $S_2$, $S_3$, $S_4$, respectively, in FIG. 6. The A/D converters 1010, 1020, 1030, 1040 generate digital versions of the signals received by the respective ultrasonic receivers $S_1$, $S_2$, $S_3$, $S_4$, which are applied to the inputs of respective digital signal processors (DSP's) 1050, 1060, 1070, 1080. The DSP's 1050, 1060, 1070, 1080 are programmed in the conventional manner to compute the phase angles $p_1$, $p_2$, $p_3$, $p_4$, of the output of the sensors $S_1$, $S_2$, $S_3$, $S_4$, respectively, relative to a common reference signal. The process by which the DSP's compute phase using fast Fourier transforms is disclosed in U.S. Pat. No. 4,333,170 to Mathews et al. Digital subtractors 1110, 1120, 1130 subtract the phase $p_1$ of the sensor $S_1$ from the phases $p_2$, $p_3$, $p_4$ of the other sensors $S_2$, $S_3$, $S_4$, respectively, to produce a phase vector P whose dimensionality is one less than the number of sensors:

$$P = \begin{vmatrix} p_{21} \\ p_{31} \\ p_{41} \end{vmatrix},$$

using the notational convention $p_{ij}=p_i-p$.

Figures 7, 8, 9:
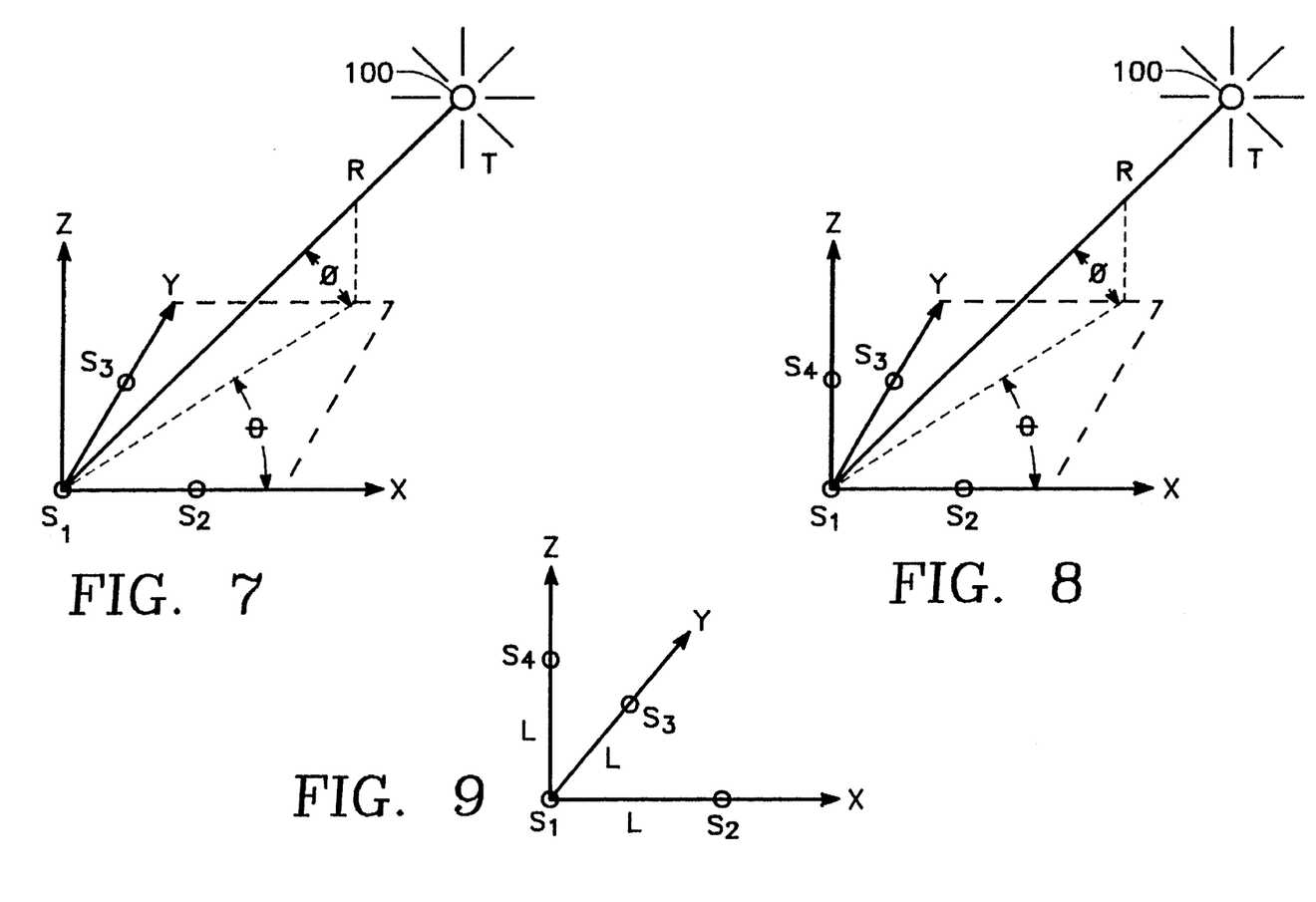
FIGS. 7 and 8 depict coordinate systems of ultrasonic sensor arrays having three and four sensors, respectively.
FIG. 9 is a diagram of a local sensor coordinate system employed in defining a displacement matrix of the sensor array.

A memory 1140 stores a matrix K which is a function of a displacement matrix D defining the locations of the sensors $S_1$, $S_2$, $S_3$, $S_4$ on the helmet 114 in a local coordinant system of the sensors. FIG. 7 illustrates the local coordinate system with three sensors $S_1$, $S_2$, $S_3$ lying in the X–Y plane of the coordinate system while FIG. 8 illustrates the local coordinate system with four sensors $S_1$, $S_2$, $S_3$, $S_4$. In FIG. 8, the sensors $S_1$, $S_2$, $S_3$ lie in the X–Y plane while the sensor $S_4$ is out of the X–Y plane and lies on the Z axis.

The D matrix mentioned in the previous paragraph is an array of difference vectors. Each difference vector is the difference $d_{i1}$ between (A) a displacement vector $d_i$ locating a respective one $S_i$ of the sensors $S_2$, $S_3$, $S_4$ in the local coordinate system and (B) the displacement vector $d_1$ locating the sensor $S_1$. The elements of each displacement vector $d_i$ are its projections along the local coordinate system axes (X, Y, Z):

$d_1 = |d_{1x}\ d_{1y}\ d_{1z}|$, $d_2 = |d_{2x}\ d_{2y}\ d_{2z}|$, $d_3 = |d_{3x}\ d_{3y}\ d_{3z}|$, and $d_4 = |d_{4x} \ d_{4y} \ d_{4z}|$.

If $d_{ij} = d_i - d_j$, then the difference matrix D may be defined as:

$$D = \begin{vmatrix} d_{21} \\ d_{31} \\ d_{41} \end{vmatrix}$$

or $$D = \begin{vmatrix} d_{21x} & d_{21y} & d_{21z} \\ d_{31x} & d_{31y} & d_{31z} \\ d_{41x} & d_{41y} & d_{41z} \end{vmatrix}$$

A simple version of the D matrix is defined with respect to the four-sensor array illustrated in FIG. 9 in which the sensor $S_1$ is located at the origin of the local coordinate system while the remaining sensors $S_2$, $S_3$, $S_4$ are located on the X, Y and Z axes, respectively displaced by the same distance L from the origin. In this especially simple example, the matrix D is given by:

$$D = L \begin{vmatrix} 1 & 0 & 0 \\ 0 & 1 & 0 \\ 0 & 0 & 1 \end{vmatrix}$$

The matrix K stored in the memory 1090 is computed from the matrix D as follows:

$K = [c/2\pi i f][D^T D D^T]^{-1}$.

Referring again to FIGS. 7 and 8, the orientation of the transmitter 100 relative to the local coordinate system of the sensors $S_1$, $S_2$, $S_3$, $S_4$ on the helmet 114 is given by the azimuth angle ($\Theta$) and the elevation angle ($\phi$). The unit vector parallel to the vector R locating the transmitter 100 in the sensor local coordinate system is:

$$u = \begin{vmatrix} u_x \\ u_y \\ u_z \end{vmatrix} = \begin{vmatrix} \cos(\Theta)\cos(\phi) \\ \sin(\Theta)\cos(\phi) \\ \sin(\phi) \end{vmatrix}$$

The unit vector u is the (unknown) orientation of the transmitter in the sensor local coordinate system of FIG. 8. It is computed from the matrix K stored in the memory and from the phase difference vector P by a matrix multiplication process carried out in a matrix multiplier 1150 as follows: ti u=KP.

The matrix multiplier 1150 obtains the elements of the vector P from the outputs of the subtractors 1110, 1120, and obtains the K matrix from the memory 1140. An algebraic processor 1160 employs ordinary trigonometric relationships to solve for the individual azimuth and elevation angles $\Theta$ and $\phi$ from the three elements of u ($u_x$, $u_y$, $u_z$) obtained from the output of the matrix multiplier 1150. The values of $\Theta$ and $\phi$ are updated as fast as the DSP's 1050, 1060, 1070, 1080 can compute new values of the phase angles of the signals from the ultrasonic sensors.

Range

Figure 10A:
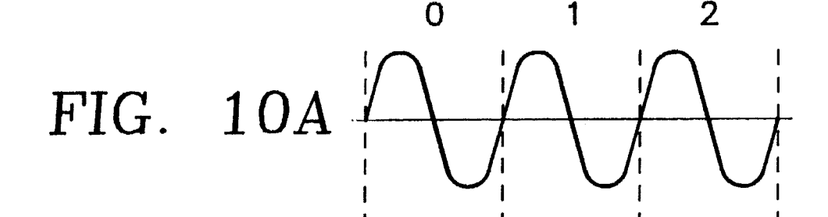
FIGS. 10A, 10B, 10C and 10D are time domain waveforms of various PSK encoded ultrasonic signals representing binary values of 0, 1, 2 and 3, respectively.
Figure 10B:
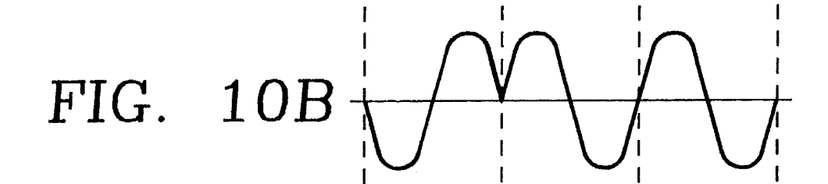
Figure 10C:
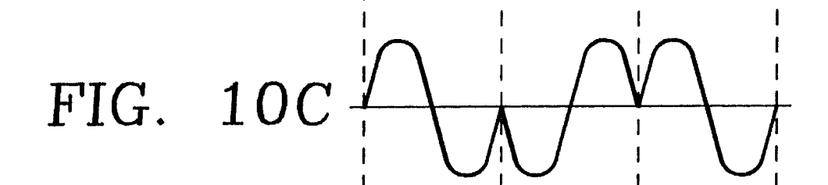
Figure 10D:
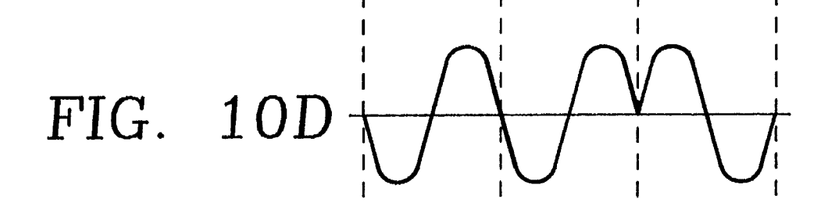

The range is also obtained from the ultrasonic signal of frequency f from the single transmitter 100. For this purpose, a conventional phase shift key (PSK) encoder 1300 encodes the output of the ultrasonic signal generator 250 in the manner illustrated in FIGS. 10A–D. In the example of FIGS. 10A–D, three cycles of the ultrasonic signal from the signal generator 250 are used to represent the states of three binary bits. As indicated in the drawing, the first, second and third cycles of the signal correspond to bits 0, 1 and 2, respectively. In FIG. 10A, none of the three cycles is changed in phase, so that the three cycles together represent a binary value of zero. In FIG. 10B, only the first cycle (corresponding to bit zero) is shifted in phase by 180 degrees, so that the three cycles together represent a binary value of one. In FIG. 10C, only the second cycle (corresponding to bit one) is shifted in phase by 180 degrees, so that the three cycles together represent a binary value of two. In FIG. 10D, both the first and second cycles (corresponding to binary bits zero and one) are shifted in phase by 180 degrees, so that the three cycles together represent a binary value of three. In this way, the three cycles can represent any number from zero to seven. Of course the number N of cycles of the ultrasonic signal used to represent a value or "byte" may be larger than 3, so that the maximum value is $2^N-1$. Thus, every N cycles of the ultrasonic signal produced by the generator 250, a complete binary number having N bits has been transmitted by the transmitter 100. This number is detected by a conventional PSK decoder 1400 whose input is connected to the output of the A/D converter 1010. In the embodiment of FIG. 6, the PSK decoder 1400 converts the PSK encoded signal received by the sensor $S_1$ to a binary count every N cycles of the ultrasonic signal at the frequency f.

Figure 11:
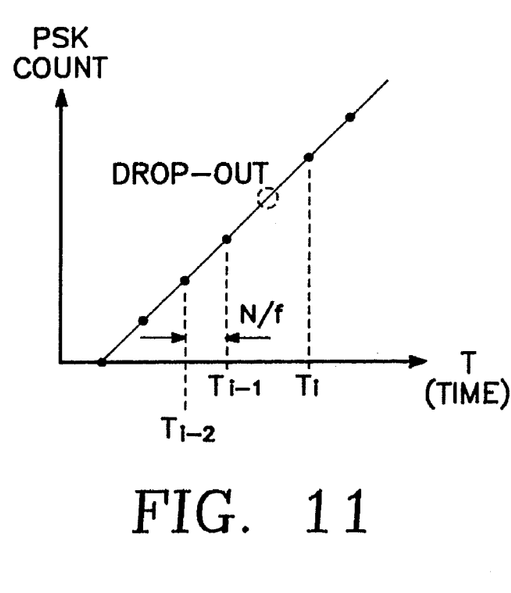
FIG. 11 is a graph illustrating the output of the PSK encoder as a function of time.

The output of the PSK encoder 1300 is a series of monotonically increasing decoder counts (depicted on the ordinant of the graph of FIG. 11) over time (depicted on the abscissa of the graph of FIG. 11. As shown in FIG. 11, a series of encoder counts $ne_i$ is produced by the encoder 1400 at successive times $T_i$, where i increases from 0 to N, after which the encoder counts repeat. The time between successive encoder counts is N/f, where N is the number of cycles or bits of the PSK code and f is the frequency of the ultrasonic signal from the generator 250. The output of the PSK decoder 1400 is the same as that of the PSK encoder illustrated in FIG. 11, except that it is shifted in time by the time-of-flight, R/c, from the transmitter 100 to the sensor $S_1$ (where R is the distance and c is the ultrasonic propagation speed). Moreover, due to noise in the environment surrounding the sensor array or helmet, there may be drop-outs in the received signal at the sensor $S_1$, as suggested in the drawing of FIG. 11 between times $T_{i-1}$ and $T_i$.

A range processor 1500 receives via electrical conductors or optical fibers the encoder counts ne from the PSK encoder 1300 and decoder counts nd from the PSK decoder 1400. Compared to the time-of-flight from the transmitter 100 to the sensor $S_1$, the transmission of the encoder and decoder counts, ne and nd, may be considered as instantaneous. Therefore, the range processor can compare the two counts to compute the range R.

Figure 12:
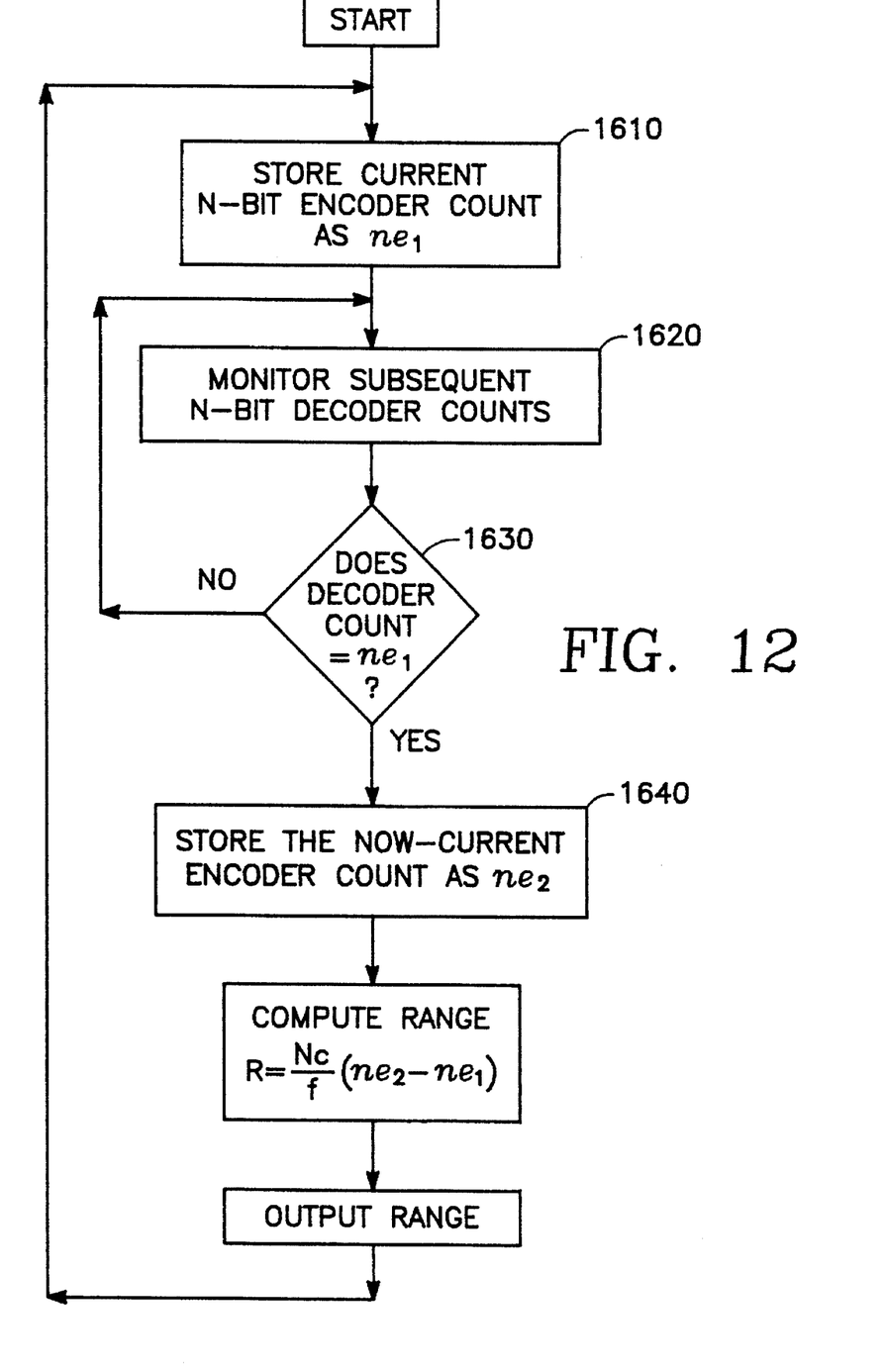
FIG. 12 is a block diagram illustrating an algorithm carried out by a range processor in the system of FIG. 6 to compute range.

FIG. 12 illustrates one algorithm carried out by the range processor 1500 to compute the range. The range processor 1500 stores the current N-bit encoder count $ne_i$ (block 1610 of FIG. 12) from the PSK encoder 1300 and calls it "$ne_1$". The range processor 1500 then monitors subsequent N-bit decoder counts nd from the PSK decoder 1400 (block 1620 of FIG. 12). Until a decoder count nd is detected that equals (or exceeds) the value of the encoder count $ne_i$ previously stored in the step of block 1610, the range processor continues to monitor the decoder counts nd (NO branch of block 1630). As soon as the decoder count nd reaches the value of the previously stored encoder count $ne_i$ (YES branch of block 1630), the range processor immediately stores the value of the latest (now-current) encoder count ne received from the PSK encoder 1300 and stores it as "$ne_2$" (block 1640). The range processor then computes the range from $ne_1$ and $ne_2$ as follows:

$$R=[Nc/f][ne_2-ne_1],$$

where N is the number of bits in the PSK code, c is the propagation speed of the ultrasonic signal from the transmitter 100 to the sensor $S_1$ and f is the frequency of the ultrasonic signal.

An advantage of using only a single ultrasonic transmitter and ultrasonic frequency for all ultrasonic sensors is the lack of noise and reliability of the signal processing. The matrix multiplication process carried out with the matrix multiplier 1150 provides azimuth and elevation using only the single ultrasonic frequency signal from the transmitter 100. An advantage of the PSK ranging process of the invention is that it too requires only the single ultrasonic frequency signal from the transmitter 100.

Another advantage of the invention is that the orientation measurement is updated at fast as the DSP's can compute new phase angles, while the range measurement can be updated every N cycles of the ultrasonic signal. A further advantage is that the computation of the range is not affected by any dropouts in the received ultrasonic signal before the decoder count nd reaches the stored encoder count $ne_1$. Also, the range processor simultaneously stores many encoder counts so as to compute an new range with every encoder count.

While the invention has been described with reference to a preferred embodiment in which the differences in the P vector and the D matrix are all computed relative to sensor $S_1$, there are four ultrasonic sensors, N=3 and the PSK code employs 180-degree phase shifts, the invention may also be implemented with variations from the foregoing choices. For example, the differences in the P vector and the D matrix may be computed relative to any one of the ultrasonic sensors, the number of ultrasonic sensors may be any number greater than two, N may be greater than 3 and the PSK code may employ a phase shift other than 180 degrees (e.g., such as 90 degrees). Moreover, other encoding schemes, such as Reed-Solomon error correction codes, may be concatenated with the modulation code, while modulation codes other than PSK encoding may be employed, provided they may be superimposed on the ultrasonic signal of frequency f.

While the invention has been described in detail by specific reference to preferred embodiments thereof, it is understood that variations and modifications may be made without departing from the true spirit and scope of the invention.

What is claimed is:

1. An acoustic tracking system, comprising:

a transmitter producing an acoustic signal of frequency f at first location;

an array of plural acoustic detectors at a second location, said array of plural acoustic detectors comprising plural detectors at discrete locations, said plural detectors being responsive to said acoustic signal to produce respective plural electronic signals corresponding to said acoustic signal as received at respective ones of said plural detectors, said array having a frame of reference;

a processor for generating a location Signal defining an orientation of said first location relative to said second location;

means for storing a matrix K which is a function of a displacement matrix D comprising vectors defining locations of respective ones of said plural detectors in said frame of reference;

means for sensing the phase angles of each of said electronic signals and for producing a phase difference vector comprising, respectively, differences between the phase angle of the electronic signal of one of said plural detectors and the phase angles of the electronic signals of respective remaining ones of said plural detectors;

means for producing an orientation vector defining an orientation of said transmitter relative to said frame of reference of said array of detectors by multiplying said phase difference vector by said matrix K; and wherein, the processor comprises means for producing an updated location signal from said orientation vector.

2. The acoustic tracking system of claim 1 further comprising means for computing an azimuth angle and an elevation angle from said orientation vector.

3. The acoustic tracking system of claim 1 further comprising:

a phase shift key encoder connected to said transmitter for encoding every N cycles of said acoustic signal with one of a succession of encoder counts;

a phase shift key decoder coupled to receive an electronic signal from one of said plural detectors for producing a new decoder count every N cycles of said electronic signal that are decodable; and a range processor connected to said phase shift key encoder and to said phase shift key decoder to receive simultaneously said encoder counts and said decoder counts, said range processor comprising means for computing from said encoder counts and said decoder counts a distance between said transmitter and said one detector.

4. The acoustic tracking system of claim 3 wherein said means for computing comprises:

means for storing a first encoder count from said phase shift key encoder;

means responsive upon receipt from said phase shift key decoder of a decoder count equal to said first encoder count for sensing a concurrent encoder count from said phase shift key encoder; and means for computing said distance from a difference between said concurrent encoder count and said first encoder count.

5. The acoustic tracking apparatus of claim 4 wherein said means for computing comprises means for multiplying said difference by Nc/f, where N is the number of cycles of said acoustic signal encoded by said phase shift key encoder with an encoder count, c is the speed of propagation of said acoustic signal from said transmitter to said array of acoustic detectors and f is the frequency of said acoustic signal.

6. The acoustic tracking system of claim 5 wherein said encoder count and said decoder count each lie in a range of values between 0 and $2^N-1$.

7. The acoustic tracking system of claim 6 wherein said phase shift key encoder employs a phase shift key code in which respective ones of said N cycles correspond to respective binary bits and wherein each one of said N cycles represents a binary one if shifted by a predetermined phase shift and represents a binary zero if not shifted.

8. The acoustic tracking system of claim 7 wherein said predetermined phase shift is 180 degrees.

9. The acoustic tracking system of claim 1 wherein at least some of said plural acoustic detectors lie in a plane.

10. The acoustic tracking system of claim 9 wherein at least another one of said plural detectors lies out of said plane.

11. An ultrasonic tracking system, comprising:

an array of plural ultrasonic detectors at discrete locations, said plural detectors being responsive to an ultrasonic signal of frequency f emanating from a remote transmitter to produce respective plural electronic signals corresponding to said ultrasonic signal as received at respective ones of said plural detectors;

a processor for generating a location signal defining an orientation of said remote transmitter to said array;

means for storing a matrix K which is a function of a displacement matrix D comprising location vectors defining locations of respective ones of said plural detectors in said frame of reference;

means for sensing the phase angles of each of said electronic signals and for producing a phase difference vector comprising, respectively, differences between the phase angle of the electronic signal of one of said plural detectors and the phase angles of the electronic signals of respective remaining ones of said plural detectors;

means for producing an orientation vector defining an orientation of said transmitter relative to said frame of reference of said array of detectors by multiplying said phase difference vector by said matrix K; and wherein, the processor comprises means for producing an updated location signal from said direction of travel.

12. The ultrasonic tracking system of claim 11 further comprising means for computing an azimuth angle and an elevation angle from said orientation vector.

13. The ultrasonic tracking system of claim 12 wherein said means for sensing phase angles comprise:

respective analog to digital converters having analog inputs connected to respective ones of said plural detectors and having digital outputs;

respective digital signal processors having digital inputs connected to the digital outputs of respective analog to digital converters, said digital signal processors being programmed to compute a phase angle of the signal received at its input.

14. The ultrasonic tracking system of claim 11 wherein each row of said displacement matrix D comprises a respective one of said location vectors, and wherein said matrix K is equal to $[c/2\pi i f][D^T D D^T]^{-1}$, where c is the speed of propagation of said ultrasonic signal and f is the frequency of said ultrasonic signal.

15. The ultrasonic tracking system of claim 11 further comprising:

a phase shift key encoder connected to said transmitter for encoding every N cycles of said ultrasonic signal with one of a succession of encoder counts;

a phase shift key decoder coupled to receive an electronic signal from one of said plural detectors for producing a new decoder count every N cycles of said electronic signal that are decodable; and a range processor connected to said phase shift key encoder and to said phase shift key decoder to receive simultaneously said encoder counts and said decoder counts, said range processor comprising means for computing from said encoder counts and said decoder counts a distance between said transmitter and said one detector.

16. The ultrasonic tracking system of claim 15 wherein said means for computing comprises:

means for storing a first encoder count from said phase shift key encoder;

means responsive upon receipt from said phase shift key decoder of a decoder count equal to said first encoder count for sensing a concurrent encoder count from said phase shift key encoder; and means for computing said distance from a difference between said concurrent encoder count and said first encoder count.

17. The ultrasonic tracking apparatus of claim 16 wherein said means for computing comprises means for multiplying said difference by Nc/f, where N is the number of cycles of said ultrasonic signal encoded by said phase shift key encoder with an encoder count, c is the speed of propagation of said ultrasonic signal from said transmitter to said array of ultrasonic detectors and f is the frequency of said ultrasonic signal.

18. The ultrasonic tracking system of claim 17 wherein said encoder count and said decoder count each lie in a range of values between 0 and $2^N - 1$.

19. The ultrasonic tracking system of claim 18 wherein said phase shift key encoder employs a phase shift key code in which respective ones of said N cycles correspond to respective binary bits and wherein each one of said N cycles represents a binary one if shifted by a predetermined phase shift and represents a binary zero if not shifted.

20. The ultrasonic tracking system of claim 19 wherein said predetermined phase shift is 180 degrees.

* * * * *